United States Patent
Matsuhashi

(10) Patent No.: US 7,322,657 B2
(45) Date of Patent: Jan. 29, 2008

(54) STROKE SIMULATOR

(75) Inventor: Takaaki Matsuhashi, Anjo (JP)

(73) Assignee: Advics Co., Ltd., Achi-pref. (JP)

( * ) Notice: Subject to any disclaimer, the term of this patent is extended or adjusted under 35 U.S.C. 154(b) by 663 days.

(21) Appl. No.: 10/771,468

(22) Filed: Feb. 5, 2004

(65) Prior Publication Data

US 2004/0181381 A1    Sep. 16, 2004

(30) Foreign Application Priority Data

Mar. 13, 2003    (JP) ............... 2003-067931

(51) Int. Cl.
*B60T 8/34*    (2006.01)

(52) U.S. Cl. ............... 303/113.4; 303/113.1; 188/358

(58) Field of Classification Search ............ 303/113.4, 303/113.1, DIG. 11; 188/357, 358; 60/533, 60/555
See application file for complete search history.

(56) References Cited

U.S. PATENT DOCUMENTS 5,038,564 A * 8/1991 Horiuchi et al. ............. 60/555
5,467,851 A * 11/1995 Handke et al. ............. 188/313
6,139,119 A   10/2000 Otomo
6,808,238 B2 * 10/2004 Drott et al. ............... 303/114.1
2002/0116924 A1 * 8/2002 Winkelmann et al. ........ 60/533
2002/0140286 A1   10/2002 Ishimura et al.
2004/0061375 A1 *  4/2004 Drott et al. .................. 303/20

FOREIGN PATENT DOCUMENTS

| DE | 19836139 | 3/1999 |
|---|---|---|
| JP | A-03-045457 | 2/1991 |
| JP | A-09-123901 | 5/1997 |
| JP | A-H09-244523 | 9/1997 |

OTHER PUBLICATIONS

Office Action from Japanese Patent Office issued on Nov. 21, 2006 for the corresponding Japanese patent application No. 2003-067931 (a copy and English translation thereof).
Official Action from Japanese Patent Office issued on Feb. 1, 20076 for the corresponding Japanese patent application No. 2003-067931 (a copy and English translation thereof).

* cited by examiner

*Primary Examiner*—Robert A. Siconolfi
*Assistant Examiner*—Mariano Sy
(74) *Attorney, Agent, or Firm*—Posz Law Group, PLC

(57) ABSTRACT

A second piston includes a first protruding portion that protrudes toward a first piston and a second protruding portion that protrudes toward a stopper. By changing a height of the first protruding portion and a height of the second protruding portion it is possible to adjust both a stroke S1 and a stroke S2, and an overall stroke. Further, it is possible to independently change the respective heights of the protruding portions using a cutting process.

9 Claims, 5 Drawing Sheets

STROKE SIMULATOR

CROSS REFERENCE TO RELATED APPLICATION

This application is based upon and claims the benefit of Japanese Patent Application No. 2003-067931 filed on Mar. 13, 2003, the content of which are incorporated herein by reference.

FIELD OF THE INVENTION

The invention relates to a stroke simulator that generates a stroke of a brake pedal such that a size of the stroke corresponds with an operation force of the brake pedal.

BACKGROUND OF THE INVENTION

A conventional stroke simulator 40, as shown in FIG. 5, is provided with a piston 42 and a retainer 44a that move as a result of hydraulic fluid pressure that accords with an operation force of a brake pedal; a stopper 45 that regulates a maximum movement range of the retainer 44a when increase in hydraulic fluid pressure occurs; and a first spring 46 and a second spring 47 that urge the piston 42 and the retainer 44a in a direction that resists hydraulic fluid pressure. The first spring 46 is disposed between the piston 42 and the retainer 44a, and the second spring 47 is disposed between the retainer 44a and the stopper 45.

Further, along with increase in hydraulic fluid pressure, the piston 42 moves to a side of the retainer 44a while compressing the first spring 46. Then, the piston 42 and the retainer 44a move in an integrated manner to a side of the stopper 45, while compressing the second spring 47. Due to spring reaction force at this time, a predetermined brake operation feeling is imparted to the driver.

Moreover, a shock absorbing elastic body 90a made of rubber is attached to the retainer 44a. Just before the first spring 46 is fully compressed, and just before the second spring 47 is fully compressed, the shock absorbing elastic body 90a is compressed so as to smoothly change the overall spring characteristic like a second order curve. Accordingly, a desirably brake operation feeling is imparted to the driver (for an example of the above described art, refer to Japanese Patent Laid-Open Publication No 2002-293229)

However, the fundamental simulator characteristic, namely, the relationship of the operation force of the brake pedal (hereinafter referred to as a "pedal operation force") and a stroke of the brake pedal (hereinafter referred to as a "pedal stroke"), is determined by respective spring constants of the first spring 46 and the second spring 47, and a first stroke S1 and a second stroke S2 shown in FIG. 5. It should be noted that, the first stroke S1 corresponds to a distance in a movement direction between the piston 42 and the retainer 44a when hydraulic fluid pressure is zero, and the second stroke S2 corresponds to a distance in the movement direction between the retainer 44a and the stopper 45 when hydraulic fluid pressure is zero.

Note that, the required simulator characteristic varies between vehicle types. In order to obtained the required characteristic, there are occasions when the first stroke S1, the second stroke S2, and the overall stroke (which corresponds to S1+S2) are changed.

With the above described conventional stroke simulator 40, when the first stroke S1 is changed, it is necessary to make dimensional changes to the piston 42 or the retainer 44a. In the case that the second stroke S2 is changed, it is necessary to make dimensional changes to the retainer 44a or the stopper 45.

In the case that the overall stroke remains the same, it is possible to address the required characteristic by just making dimensional changes to the retainer 44a. Moreover, if a thickness of a base portion of the retainer 44a can be set as chosen, it is possible to simultaneously change both the strokes S1 and S2 by simply changing the thickness of the base portion of the retainer 44a. However, the retainer 44a, which has a cup-like shape, is typically made by press forming. Thus, substantial change of the thickness of the base portion of the retainer 44a is impossible. Accordingly, in the case that both of the strokes S1 and S2, and the overall stroke, are changed, it is necessary to make dimensional changes to two members.

It should be noted that, as described previously, the rubber shock absorbing elastic body 90a is provided so as to smoothly change the overall spring characteristics like a second order curve. Fundamentally, the shock absorbing elastic body 90a does not have any impact upon setting of the strokes S1 and S2.

SUMMARY OF THE INVENTION

The invention has been conceived of in light of the previously described problems. It is an object of the invention to provide a stroke simulator for which, in the case that both a stroke S1 and a stroke S2, and an overall stroke, are to be changed, it is possible to address the change requirement by making dimensional changes to only one part of the stroke simulator.

In order to realize this object, according to a first aspect of the invention, a first stroke, which corresponds to a distance in a movement direction between a first piston and a second piston when hydraulic pressure is zero, can be changed by changing a height of a first protruding member that is formed from a non-elastic material. Further, a second stroke, which corresponds to a distance in the movement direction between the second piston and a stopper when hydraulic pressure is zero, can be changed by changing a height of a second protruding member that is formed from a non-elastic material.

In addition, the first protruding portion and the second protruding portion have a protruding-shape. Accordingly, it is possible to independently change the respective heights of the protruding portions using a cutting process. Thus, in the case that both of the strokes and the overall stroke are to be changed, it is possible to address the change requirement by simply making dimensional changes to the second piston.

In addition, according to a second aspect of the invention, the stopper has a guide portion that regulates a movement range of the second piston in a direction that is orthogonal to a movement direction of the second piston.

With the conventional art, as a movement amount of the second piston in the direction orthogonal to the movement direction of the second piston becomes excessive, the second piston is inclined. Accordingly, the simulator characteristic becomes unstable. However, according to the second aspect of the invention, it is possible to inhibit this problem from occurring.

According to a third aspect of the invention, assembly of a first spring to a first fitting portion is executed by press fitting. Accordingly, it is possible to simultaneously fit the first piston and the first spring in a housing while the first piston and the first spring are in an integrated state. On the other hand, assembly of the first spring to a second fitting portion is conducted without use of press fitting. Thus, when the second piston is fitted following fitting of the first piston and the first spring in the housing, it is possible to insert the second fitting portion into the first spring until a position at which an other end of the first spring abuts with a spring receiving surface of the second piston.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
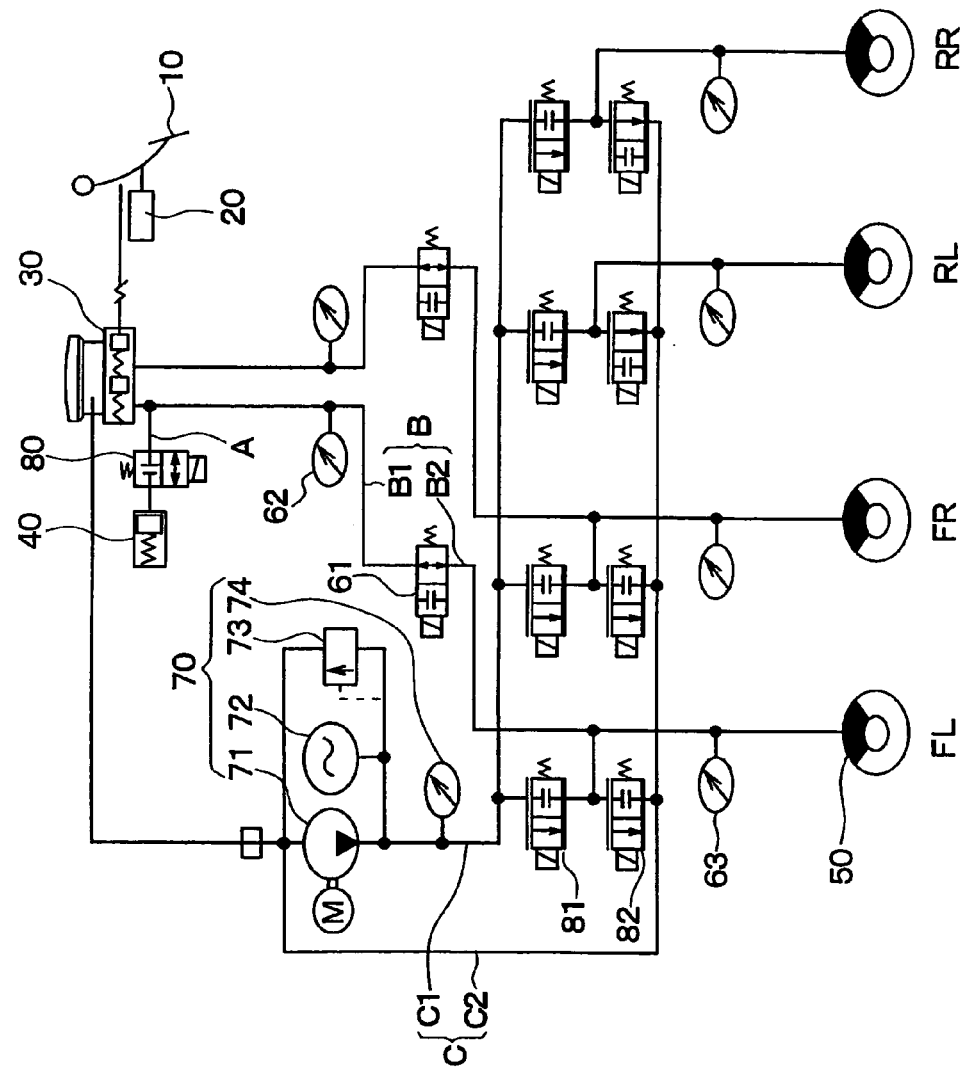
FIG. 1 shows a configuration of a brake apparatus that adopts a stroke simulator according to a first embodiment of the invention.

The present invention will be described further with reference to various embodiments in the drawings.

First Embodiment

FIG. 1 shows a brake apparatus that adopts a stroke simulator 40 according to a first embodiment of the invention. FIG. 1 shows a hydraulic circuit of the brake apparatus and connections to each of four wheels, namely a front left wheel FL, a front right wheel FR, a rear left wheel RL and a rear right wheel RR. However, since the same configuration and operation is utilized for each portion of the hydraulic circuit that executes brake hydraulic pressure control for the respective wheels FL, FR, RL and RR, the explanation presented here will only focus on the front-left wheel FL. Accordingly, an explanation of the configuration and operation of the other wheels FR, RL and RR will be omitted.

FIG. 1 shows a brake pedal 10 that is depressed by an occupant in order to apply a brake force to the vehicle. A stroke sensor 20 detects a stroke of the brake pedal 10 (hereinafter referred to as a "pedal stroke"), and generates an electric signal in accordance with the pedal stroke.

A master cylinder 30 generates a brake hydraulic pressure as a result of depression of the brake pedal 10. This brake hydraulic pressure is transmitted to the stroke simulator 40, described hereinafter, via a hydraulic conduit A, and transmitted to a wheel cylinder 50 of the front left wheel FL via a hydraulic conduit B.

A first cut-off valve 80 that opens and closes the hydraulic conduit A is disposed therein. Note that the first cut-off valve 80 is a normally closed solenoid valve.

A second cut-off valve 61, which is a normally open solenoid valve, is disposed in the hydraulic conduit B such that the second cut-off valve 61 opens and closes the hydraulic conduit B. Hereinafter, a section of the hydraulic conduit B between the second cut-off valve 61 and the master cylinder 30 will be referred to as a "M/C side hydraulic conduit B1", and a section of the hydraulic conduit B between the second cut-off valve 61 and the wheel cylinder 50 will be referred to as a "W/C side hydraulic conduit B2".

A first pressure sensor 62 that detects brake hydraulic pressure within the M/C side hydraulic conduit B1 is disposed therein. This first pressure sensor 62 generates an electric signal in accordance with brake hydraulic pressure. In addition, a second pressure sensor 63 that detects brake hydraulic pressure within the W/C side hydraulic conduit B2 is disposed therein. This second pressure sensor 63 generates an electric signal in accordance with brake hydraulic pressure.

A hydraulic conduit C is connected to the W/C side hydraulic conduit B2. A pump 71, an accumulator 72, a relief valve 73, and a third pressure sensor 74 that detects a brake hydraulic pressure of the hydraulic conduit C are provided in the hydraulic conduit C as a hydraulic pressure source 70 that generates brake hydraulic pressure. The third pressure sensor 74 generates an electric signal in accordance with brake hydraulic pressure.

The hydraulic pressure source 70 intakes brake hydraulic fluid from a reservoir, not shown, of the master cylinder 30, using the pump 71 that is driven by an electric motor. The brake hydraulic fluid, which is discharged at a high pressure by the hydraulic pressure source 70, is stored in the accumulator 72. The third pressure sensor 74 detects the pressure of the brake hydraulic fluid and regulates it to a set pressure.

A section of the hydraulic conduit C from the third pressure sensor 74 to a portion that is connected to the W/C side hydraulic conduit B2 will be referred to hereinafter as a "pressure boost hydraulic conduit C1". A pressure boost valve 81 that opens and closes the pressure boost hydraulic conduit C1 is disposed within the pressure boost hydraulic conduit C1. When the pressure boost valve 81 opens, high pressure brake hydraulic fluid is supplied from the hydraulic pressure source 70 to the wheel cylinder 50, whereby the brake hydraulic pressure of the wheel cylinder 50 increases. Note that, the pressure boost valve 81 is a normally closed solenoid valve.

A section of the hydraulic conduit C from the portion that is connected to the W/C side hydraulic conduit B2 to an intake side of the hydraulic fluid source 70 will be referred to hereinafter as a "pressure reduction hydraulic conduit C2". A pressure reduction value 82 that opens and closes the pressure reduction hydraulic conduit C2 is disposed within the pressure reduction hydraulic conduit C2. When the pressure reduction valve 82 opens, the brake hydraulic pressure of the wheel cylinder 50 reduces due to return of brake hydraulic fluid within the wheel cylinder 50 to the intake side of the hydraulic pressure source 70, or the reservoir of the master cylinder 30. Note that, the pressure reduction valve 82 is a normally closed solenoid valve.

Figure 2:
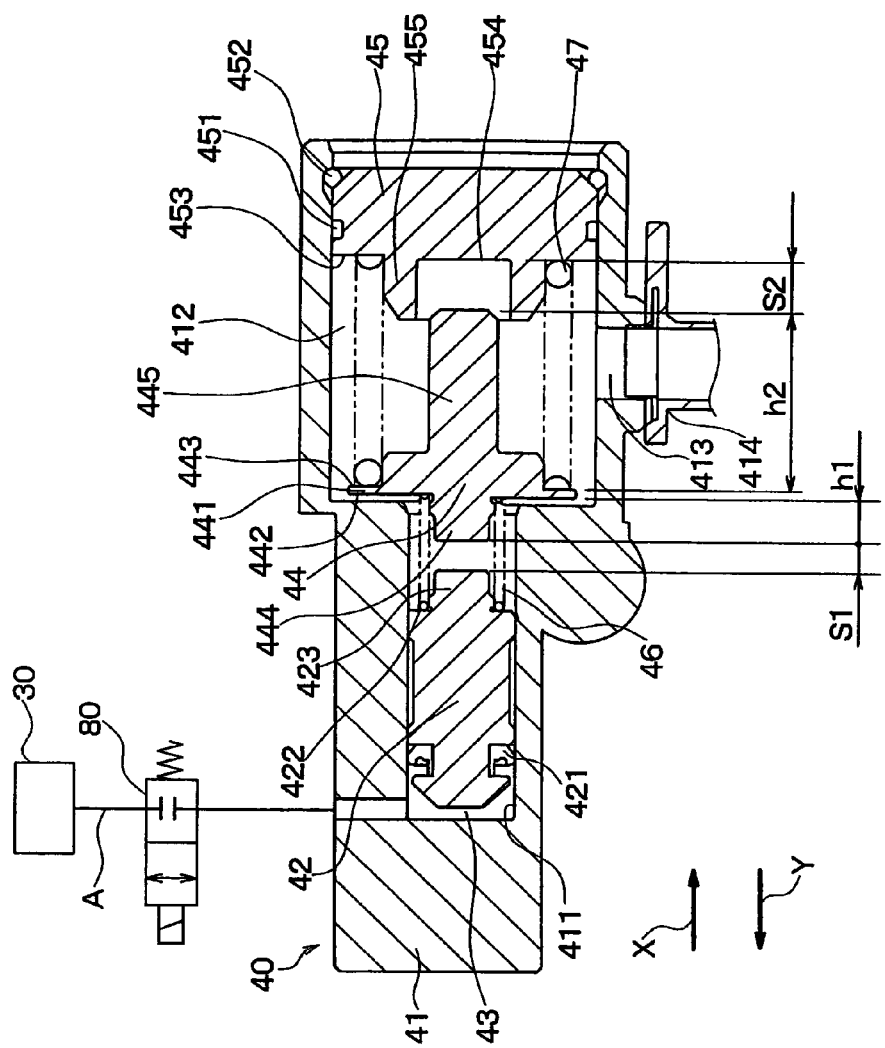
FIG. 2 is a cross sectional view of the stroke simulator of FIG. 1.

Next, the stroke simulator 40 will be described with reference to FIG. 2. It should be noted that FIG. 2 shows a state in which a hydraulic fluid pressure of a hydraulic pressure chamber 43, described hereinafter, is zero (namely, is at atmospheric pressure).

The stroke simulator 40 is an apparatus for generating the pedal stroke such that a size of the pedal stroke corresponds with an operation force of the brake pedal 10. In addition, two cylindrical holes 411 and 412 are formed in a housing 41 of the stroke simulator 40. These two holes 411 and 412 are formed so as to be coaxially in line with each other.

A first piston 42, which is generally column shaped and which is formed from a non-elastic material such as S45C steel, is slidably provided in the first hole 411. Note that, elastic deformation of the non-elastic material as described in this specification is substantially smaller than that of rubber. Accordingly, the non-elastic material may be regarded from a practical perspective as equivalent to a rigid body, such as metal, rigid resin, or the like.

A cup seal 421 that seals between an inner peripheral surface of the first hole 411 and an outer peripheral surface of the first piston 42 is provided for the first piston 42. This cup seal 421 is formed from, for example, Ethylene Propylene Diene Monomer (EPDM) rubber.

The hydraulic pressure chamber 43 is formed between a base portion of the first piston 42 and one end surface of the first piston 42. The configuration is such that brake hydraulic pressure is transmitted to the hydraulic pressure chamber 43 from the master cylinder 30, via the hydraulic conduit A.

A cylindrical second piston 44 with a flange portion 441, described hereinafter, is disposed in the second hole 412 such that the second piston 44 is facing the other end surface of the first piston 42. When the first piston 42 moves, along with increase in the brake hydraulic pressure, in a direction X that increases the capacity of the hydraulic pressure chamber 43 (hereinafter referred to as "capacity increase direction X"), the second piston 44 moves integrally with the first piston 42 from a time point at which the first piston 42 abuts with the second piston 44.

The second piston 44 is formed from a non-elastic material. In particular, it is preferable if the material of the second piston 44 is, for example, a metal like S15C steel, or a hard resin like polyacetal (POM), poly buthylene terephthalete (PBT), or poly phenylene sulfide (PPS). In addition, it is further preferable if these hard resins include a toughening agent such as glass fiber. In this case, it is desirable if the content of the toughening agent is around 30%.

A generally cylindrical stopper 45, which is formed from a non-elastic material like aluminum, is disposed in an opening portion of the second hole 412 so as to face the other end surface of the second piston 44. This stopper 45 regulates a movement range of the second piston 44 in the capacity increase direction X. An O-ring 451, which is formed from, for example, Ethylene Propylene Diene Monomer (EPDM) rubber, is disposed at an external periphery portion of the stopper 45. A retaining ring 452 that stops slip out of the stopper 45 is provided at an end portion of the stopper 45. The second hole 412 is open to the atmosphere via a through hole 413, and a watertight pipe 414 that inhibits entry of water to the second hole 412 is fitted to this through hole 413.

A first spring 46 that urges the first piston 42 in a direction Y that reduces the capacity of the hydraulic pressure chamber 43 (hereinafter referred to as "capacity reduction direction Y") is disposed between the first piston 42 and the second piston 44. This first spring 46 is, for example, a cylindrical helical compression spring made from spring steel.

A second spring 47 that urges the second piston 44 in the capacity reduction direction Y is disposed between the second piston 44 and the stopper 45. This second spring 47 is, for example, a cylindrical helical compression spring made from spring steel. Further, the second spring 47 has a spring constant that is different to that of the first spring 46. More specifically, the spring constant of the second spring 47 is set to be larger than the spring constant of the first spring 46 (for example, around ten times as large).

The end surface of the first piston 42 that faces the second piston 44 is provided with a spring receiving surface 422 that supports an end of the first spring 46; and a cylindrical first fitting portion 423 which regulates a movement range of the first spring 46 in the radial direction and onto which the end of the first spring 46 is fitted. The outer diameter dimension of the first fitting portion 423 is set to be larger than the inner diameter dimension of the first spring 46, when the first spring 46 is in a non-compressed state. Accordingly, the first spring 46 is assembled to the first fitting portion 423 by press fitting.

The second piston 44 has the flange portion 441 which is disc-shaped. This flange portion 441 is positioned in an axial direction center portion of the second piston 44. A spring receiving surface 442 is provided at one side of the flange portion 441 and supports the other end of the first spring 46. A spring receiving surface 443 at the other side of the flange portion 441 supports an end of the second spring 47.

The second piston 44 has a cylindrical first protruding portion 444 which protrudes toward a side of the first piston 42 from the flange portion 441 and which can abut with a tip surface of the fitting portion 423 of the first piston 42; and a cylindrical second protruding portion 445 which protrudes toward a side of the stopper 45 from the flange portion 441 and which can abut with a movement range regulation surface 454 (described in detail later) of the stopper 45.

Note that, in a state where hydraulic fluid pressure is zero, a movement direction distance S1 between the tip surface of the fitting portion 423 of the first piston 42 and a tip surface of the first protruding portion 444 of the second piston 44 corresponds to a first stroke S1. In addition, in a state where hydraulic fluid pressure is zero, a movement direction distance S2 between a tip surface of the second protruding portion 445 of the second piston 44 and the movement range regulation surface 454 of the stopper 45 corresponds to a second stroke S2.

The first protruding portion 444 of the second piston 44, to which the other end of the first spring 46 is fitted, regulates a movement range of the first spring 46 in the radial direction. The first protruding portion 444 corresponds to a second fitting portion according to the invention. The outer diameter dimension of the first protruding portion 444 is set to be smaller than the inner diameter dimension of the first spring 46, when the first spring 46 is in a non-compressed state. Accordingly, assembly of the first spring 46 to the first protruding portion 444 is executed without using press fitting.

An end surface of the stopper 45 that faces the second piston 44 is formed so as to have: a spring receiving surface 453 that supports the other end of the second spring 47; the movement range regulation surface 454 that can abut with the tip end of the second protruding portion 445 of the second piston 44; and a cylindrical guide portion 455 that protrudes toward a side of the second piston 44 from the spring receiving surface 453 and the movement range regulation surface 454. The second protruding portion 445 of the second piston 44 is inserted in a slidably manner within an inner periphery portion of the guide portion 455. Accordingly, the guide portion 455 regulates a movement range of the second piston 44 in a direction that is orthogonal with respect to the movement direction of the second piston 44.

Next, an explanation will be given concerning the assembly method of the stroke simulator 40. First, the spring 46 is press fitted to the first fitting portion 423 of the first piston 42 such that the first piston 42 and the first spring 46 are integrated. The first piston 42 and the first spring 46 in this integrated state, are then fitted into the first hole 411 of the housing 41. Next, the second piston 44, the second spring 47, and the stopper 45 are inserted into the second hole 412 of the stopper 45, and then the retaining ring 452 is fitted.

During the assembly, the first spring 46 and the first fitting portion 423 are assembled by press fitting. Thus, it is possible to simultaneously fit the first piston 42 and the first spring 46 into the housing 41 while the first piston 42 and the first spring 46 are in the integrated state. On the other hand, assembly of the first spring 46 and the first protruding portion 444 of the second piston 44 is executed without using press fitting. Accordingly, when the second piston 44 is fitted after the first piston 42 and the first spring 46 have been fitted into the housing 41, it is possible to insert the first protruding portion 444 into the first spring 46 as far as a position at which the other end of the first spring 46 abuts with the spring receiving surface 442 of the second piston 44.

Next, an explanation will be given concerning the operation of the brake apparatus with the above described configuration.

First, the operation of members, excluding the stroke simulator 40, will be explained with reference to FIG. 1. When the brake pedal 10 is depressed at a time when there is no abnormality in the brake apparatus, the stroke sensor 20 detects that the brake pedal 10 has been depressed, and the second cut-off valve 61 is closed so as to close the hydraulic conduit B.

Then, a target value for the brake hydraulic pressure to be applied to the wheel cylinder 50 is calculated based on the signal from the stroke sensor 20 and the first pressure sensor 62. Control is then executed such that the brake hydraulic pressure of the wheel cylinder 50 becomes equal to the target value, by driving the pump 71 as well as actuating the pressure boost valve 81 and the pressure reduction valve 82. More specifically, control of the brake hydraulic pressure of the wheel cylinder 50 is executed such that: the brake hydraulic pressure of the wheel cylinder 50 is increased by opening the pressure boost valve 81; the brake hydraulic pressure of the wheel cylinder 50 is decreased by opening the pressure reduction valve 82; and the brake hydraulic pressure of the wheel cylinder 50 is maintained by closing both the pressure boost valve 81 and the pressure reduction valve 82.

It should be noted that, in the case that vehicle wheel lock seems likely to occur during braking, so-called anti-lock braking is executed. Namely, control of the brake hydraulic pressure of the wheel cylinder 50 is executed such that, first, the pressure reduction valve 82 is opened so as to reduce the brake hydraulic pressure of the wheel cylinder 50, whereby the vehicle wheel lock that was likely to occur is avoided. Following this, control of the actuation of the pressure boost valve 81 and the pressure reduction valve 82 is executed such that a slip rate of the vehicle wheels FL, FR, RL and RR is within a predetermined range.

When depression of the brake pedal 10 is released, the stroke sensor 20 detects that depression of the brake pedal 10 has been released, and the second cut-off valve 61 is opened so as to open the hydraulic conduit B.

Next, the operation of the stroke simulator 40 will be explained with reference to FIGS. 2 and 3.

Figure 3:
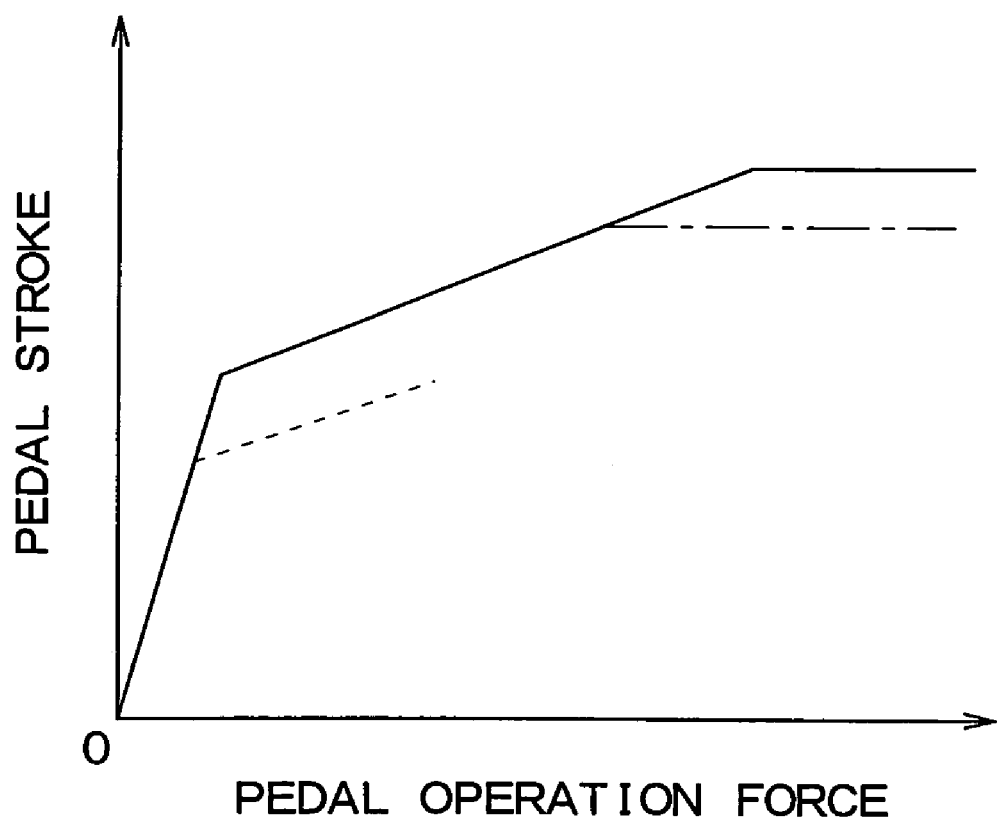
FIG. 3 is a simulator characteristic chart showing a relationship of a pedal operation force and a pedal stroke.

Note that, FIG. 3 is a simulator characteristic chart showing a relationship of the pedal operation force and the pedal stroke.

First, when the brake pedal 10 is depressed at a time when there is no abnormality in the brake apparatus, the stroke sensor 20 detects that the brake pedal 10 has been depressed, and the first cut-off valve 80 of the stroke simulator 40 is opened so as to open the hydraulic conduit A. Thus, brake hydraulic pressure is transmitted from the master cylinder 30 to the hydraulic pressure chamber 43 via the hydraulic conduit A.

The brake hydraulic pressure transmitted to the hydraulic pressure chamber 43 acts upon the first piston 42 so as to urge the first piston 42 in the capacity increase direction X. Then, along with increase in the brake hydraulic pressure, the first piston 42 resists the spring force of the first spring 46 and the second spring 47 and moves in the capacity increase direction X.

When the first piston 42 moves in the capacity increase direction X, during the period until when the tip surface of the fitting portion 423 of the first piston 42 abuts with the tip surface of the first protruding portion 444 of the second piston 44, the first spring 46, which has the small spring constant, is predominantly compressed. Accordingly, as shown in FIG. 3, a change amount of the pedal stroke with respect to a change amount of the pedal operation force is large.

From the time point at which the first piston 42 and the second piston 44 abut with each other, until the time point at which the tip surface of the second protruding portion 445 of the second piston 44 abuts with the movement range regulation surface 454 of the stopper 45, the first piston 42 and the second piston 44 move as an integral unit. At this time, the second spring 47, which has the large spring constant, is compressed. Accordingly, as shown in FIG. 3, the change amount of the pedal stroke with respect to the change amount of the pedal operation force is small.

Further, once the tip surface of the second protruding portion 445 of the second piston 44 abuts with the movement range regulation surface 454 of the stopper 45, as shown in FIG. 3, the pedal stroke does not change even if the pedal operation force increases.

When the second piston 44 moves, the second protruding portion 445 of the second piston 44 is guided by the guide portion 455 of the stopper 45. Accordingly, the movement range of the second piston 44 in the direction orthogonal to the movement direction of the second piston 44 is regulated, and inclination of the second piston 44 is inhibited. Thus, the simulator characteristic is stable.

With the stroke simulator 40, it is possible to change the first stroke S1 by changing a height h1 of the first protruding portion 444 from the spring receiving surface 442, which is one of the spring receiving surfaces of the second piston 44. Note that, for example, if the height h1 of the first protruding portion 444 is made larger so that the first stroke S1 is smaller, the simulator characteristic becomes that indicated by the dotted line in FIG. 3.

Moreover, it is possible to change the second stroke S2 by changing a height h2 of the second protruding portion 445 from the spring receiving surface 443, which is the other spring receiving surface of the second piston 44. Note that, for example, if the height h2 of the second protruding portion 445 is made larger so that the first stroke S2 is smaller, the simulator characteristic becomes that indicated by the long-dash dot line in FIG. 3.

Furthermore, since the first protruding portion 444 and the second protruding portion 445 have a protruding-shape, it is easily possible to independently change the heights h1 and h2 for each protruding portion using a cutting process. Accordingly, in the case that both the strokes S1 and S2, and the overall stroke, are to be changed, it is possible to address the change requirement by simply making dimensional changes to the second piston 44.

Next, the operation of the brake apparatus in the case that an abnormality occurs will be explained with reference to FIG. 1. For example, in the case that an abnormality such as a breakdown of the hydraulic pressure source 70 has occurred, the first cut-off valve 80, the pressure booster valve 81, and the pressure reduction valve 82 are closed, and the second cut-off valve 61 is opened. If the brake pedal 10 is depressed in this state, brake hydraulic pressure is supplied to the wheel cylinder 50 from the master cylinder 30 via the hydraulic conduit B, and it is possible to execute normal braking.

According to this embodiment, it is possible to adjust both of the strokes S1 and S2 and the overall stroke by changing the height h1 of the first protruding portion 444 and the height h2 of the second protruding portion 445 of the second piston 44. Thus, even in the case that both of the strokes S1 and S2 and the overall stroke are to be changed, it is possible to address the change requirement by simply making dimensional changes to the second piston 44.

Figure 5:
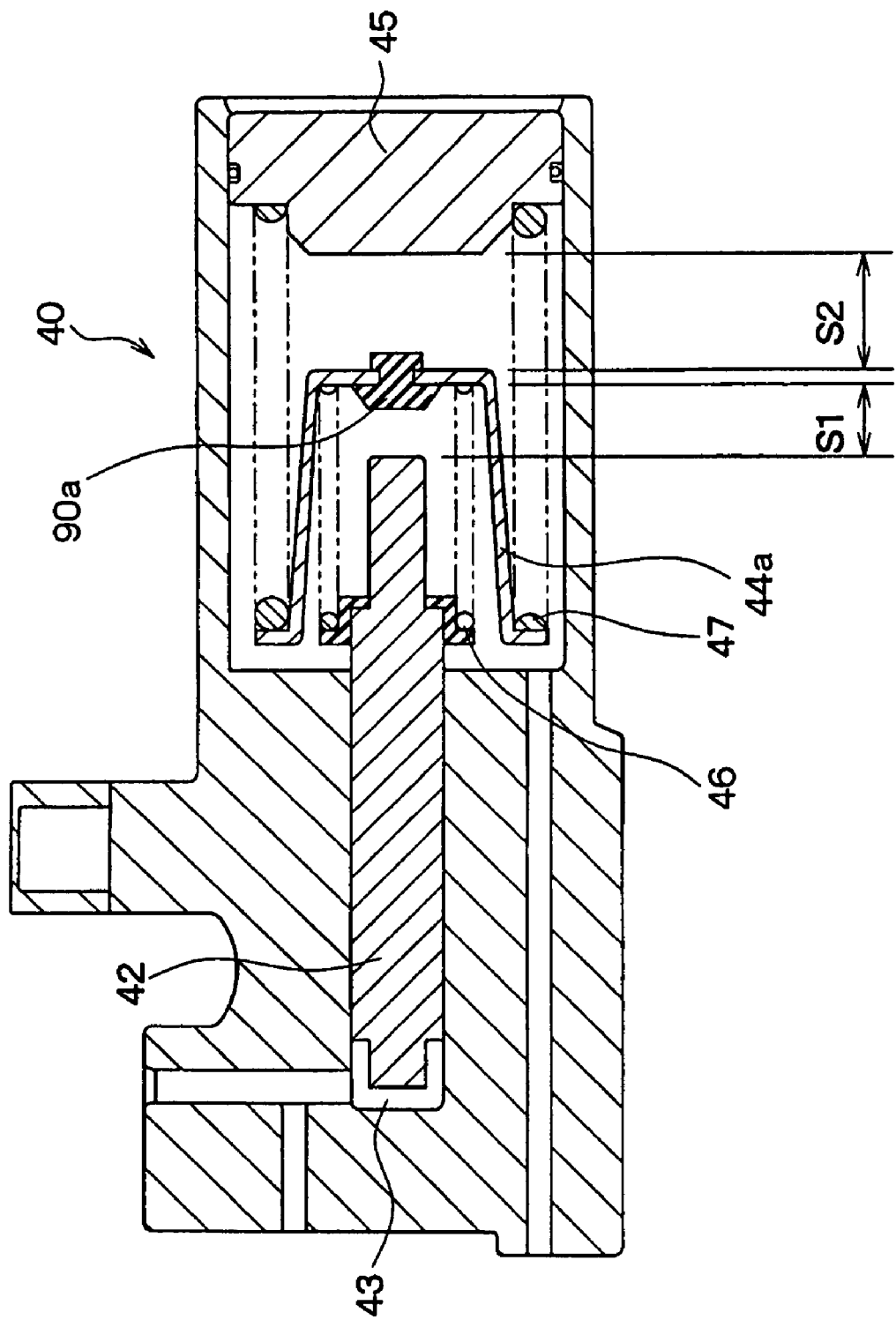
FIG. 5 is a cross sectional view of a conventional stroke simulator.

In addition, with the conventional stroke simulator 40 shown in FIG. 5, the shock absorbing elastic body 90a is interposed between the piston 42 and the retainer 44a, and between the retainer 44a and the stopper 45. Accordingly, a problem may occur in which the respective strokes S1 and S2 change due to wear or plastic deformation of the shock absorbing elastic body 90a.

In contrast to this, with the stroke simulator 40 of this embodiment, a shock absorbing elastic body is not interposed between the first piston 42 and the second piston 44, or between the second piston 44 and the stopper 45. Accordingly, the respective strokes S1 and S2 are not liable to change.

Moreover, the second protruding portion 445 of the second piston 44 is guided by the guide portion 455 of the stopper 45. Thus, the movement range of the second piston 44 in the direction orthogonal to the movement direction of the second piston 44 is regulated, and inclination of the second piston 44 is inhibited. Accordingly, the simulator characteristic is stable.

In addition, the first spring 46 is assembled to the first fitting portion 423 by press fitting. Thus, it is possible to simultaneously fit the first piston 42 and the first spring 46 in the housing 41 while they are in an integrated state. On the other hand, assembly of the first spring 46 with the first protruding portion 444 of the second piston 44 is executed without using press fitting. Therefore, when the second piston 44 is fitted following fitting of the first piston 42 and the first spring 46 in the housing 41, it is possible to insert the first protruding portion 444 into the first spring 46 until the position at which the other end of the first spring 46 abuts with the spring receiving surface 442 of the second piston 44.

Second Embodiment

Figure 4:
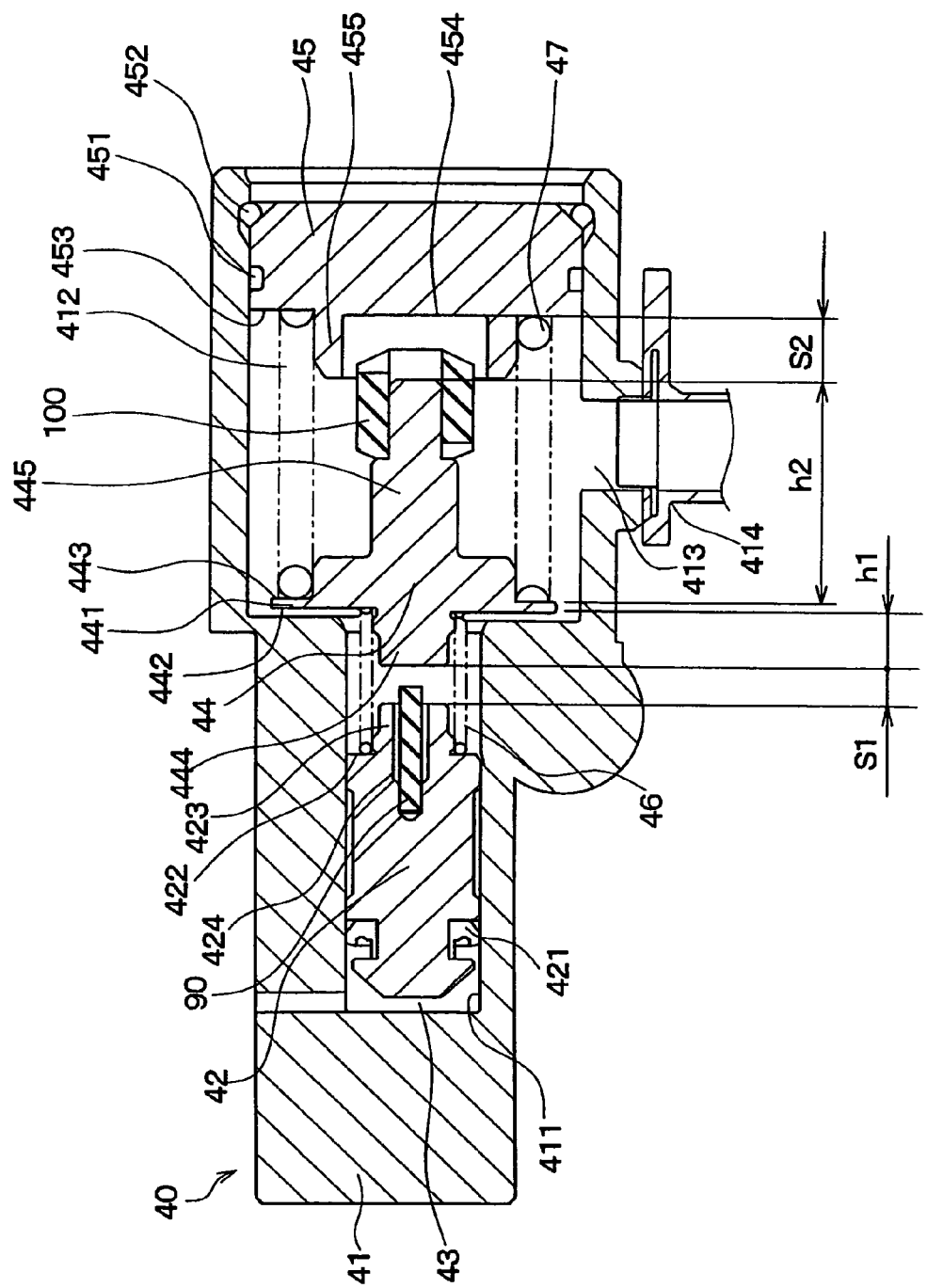
FIG. 4 is a cross sectional view of the stroke simulator according to a second embodiment of the invention.

FIG. 4 shows the stroke simulator 40 according to the second embodiment of the invention. The second embodiment differs from the first embodiment with respect to the fact that first and second shock absorbing elastic bodies 90 and 100 are provided. It should be noted that structural members of the second embodiment that are the same as those of the first embodiment are denoted with the same reference numerals or characters, and their explanation is omitted.

As shown in FIG. 4, a hole 424 is formed in a side of the first fitting portion 423 of the first piston 42. The first shock absorbing elastic body 90, which is cylindrical, is inserted in this hole 424. In a state in which hydraulic fluid pressure is zero, an end of the first shock absorbing elastic body 90 protrudes toward a side of the second piston 44 from the hole 424.

The second shock absorbing elastic body 100, which is cylindrical, is disposed at an external periphery of the second protruding portion 445 of the second piston 42. In a state in which hydraulic fluid pressure is zero, an end of the second shock absorbing elastic body 100 protrudes further toward a side of the movement range regulation surface 454 of the stopper 45 than the tip surface of the second protruding portion 445.

The first shock absorbing elastic body 90 and the second shock absorbing elastic body 100 are formed from a material having elastic deformation that is substantially larger than that of metal or hard resin. More particularly, the elastic bodies 90 and 100 are formed from a rubber, namely, for example, Ethylene Propylene Diene Monomer (EPDM) rubber.

With the above configuration, when the first piston 42 moves in the capacity increase direction X, the first shock absorbing elastic body 90 abuts with the first protruding portion 444 of the second piston 44 prior to when the first piston 42 and the second piston 44 abut with each other. Accordingly, the first shock absorbing elastic body 90 is compressed. Further, at the time point when the first piston 42 and the second piston 44 abut, the entire first shock absorbing elastic body 90 is fully inserted with the hole 424. Thus, even if the pedal operation force increases after the first piston 42 and the second piston 44 have abutted with each other, load acting upon the first shock absorbing elastic body 90 does not increase.

When the first piston 42 and the second piston 44 are moved further in the capacity increase direction X, the second shock absorbing elastic body 100 abuts with the movement range regulation surface 454 prior to when the tip surface of the second protruding portion 445 of the second piston 44 abuts with the movement range regulation surface 454 of the stopper 45. Accordingly, the second shock absorbing elastic body 100 is compressed. Moreover, at the time point when the tip surface of the second protruding portion 445 abuts with the movement range regulation surface 454, an end of the second shock absorbing elastic body 100 is pushed back as far as the tip surface of the second protruding portion 445. Accordingly, even if the pedal operation force increases after the tip surface of the second protruding portion 445 has abutted with the movement range regulation surface 454, load that acts upon the second shock absorbing elastic body 100 does not increase.

According to this embodiment, it is possible to smoothly change the overall spring characteristic like a second order curve, due to the action of the first shock absorbing elastic body 90 and the second shock absorbing elastic body 100. Accordingly, it is possible to impart a desirable brake operation feeling to the driver.

However, with the conventional stroke simulator 40 shown in FIG. 5, the shock absorbing elastic body 90a is interposed between the piston 42 and the retainer 44a, and between the retainer 44a and the stopper 45. Thus, along with increase of the pedal operation force, load that acts upon the shock absorbing member 90a increases. Accordingly, the simulator characteristic is liable to change, since wear or plastic deformation of the shock absorbing elastic body 90a is more likely to occur.

In contrast to this, with the stroke simulator 40 of this embodiment, even if the pedal operation force increases after the first piston 42 and the second piston 44 have abutted with each other, the load that acts upon the first shock absorbing elastic body 90 does not increase. Moreover, even if the pedal operation force increases after the tip surface of the second protruding portion 445 has abutted with the movement range regulation surface 454, the load that acts upon the second shock absorbing elastic body 100 does not increase. Accordingly, with this embodiment, it is difficult for wear or elastic deformation of the first shock absorbing elastic body 90 and the second shock absorbing elastic body 100 to occur. Thus, this embodiment offers the advantage that it is difficult for the simulator characteristic to change.

While the above description is of the preferred embodiments of the present invention, it should be appreciated that the invention may be modified, altered, or varied without deviating from the scope and fair meaning of the following claims.

What is claimed is:

1. A stroke simulator that generates a stroke of a brake pedal, a size of the stroke being in accordance with an operation force of the brake pedal, wherein the stroke simulator comprises:
    a housing;
    a first piston which is movably disposed within the housing in a fluid-tight manner;
    a hydraulic pressure chamber which is formed at an end side of the first piston and to which hydraulic pressure is supplied in accordance with the operation force of the brake pedal;
    a second piston which is disposed at the other end side of the first piston and which can move integrally with the first piston;
    a stopper that regulates a movement range of the second piston in a direction that increases a capacity of the hydraulic pressure chamber;
    a first spring which is disposed between the first piston and the second piston and which urges the first piston in a direction that reduces the capacity of the hydraulic pressure chamber; and
    a second spring which has a second spring constant that is different to a first spring constant of the first spring, and which urges the second piston in the direction that reduces the capacity of the hydraulic pressure chamber, wherein
    the second piston has a first protruding portion which protrudes towards the first piston and which can abut with the first piston, and a second protruding portion which protrudes towards the stopper and which can abut with the stopper, a section of the second piston that includes the first protruding portion and the second protruding portion being formed from a non-elastic material,
    the first piston includes an axial hole formed in the first piston at a center of an end surface of the first piston on a side of the second piston, a first shock absorbing elastic body, which is cylindrical, is inserted in the hole, and one end of the first shock absorbing elastic body protrudes from the axial hole when a hydraulic fluid pressure of the hydraulic pressure chamber is zero,
    a second shock absorbing elastic body, which is cylindrical, is located at an external periphery of the second protruding portion, and one end of the second shock absorbing elastic body protrudes further toward the stopper than a distal end of the second protruding portion,
    the first shock absorbing elastic body is compressed by abutment with the first protruding portion prior to when the first piston and the first protruding portion abut with each other when the first piston moves in the direction that increases the capacity of the hydraulic pressure chamber,
    when the first piston and the first protruding portion abut with each other, the entirety of the first shock absorbing elastic body is fully located within the axial hole,
    the second shock absorbing elastic body is compressed by abutting with the stopper, prior to when the second protruding portion and the stopper abut with each other, when the first piston and the second piston move integrally in the direction that increases the capacity of the hydraulic pressure chamber, and
    the one end of the second shock absorbing elastic body is pushed back as far as the distal end of the second protruding portion when the second protruding portion abuts against the stopper.

2. The stroke simulator according to claim 1, wherein the non-elastic material is one of metal and hard resin.

3. The stroke simulator according to either claim 1, wherein the stopper has a guide portion that regulates a movement range of the second piston in a direction that is orthogonal to a movement direction of the second piston.

4. The stroke simulator according to either claim 2, wherein the stopper has a guide portion that regulates a movement range of the second piston in a direction that is orthogonal to a movement direction of the second piston.

5. The stroke simulator according to claim 1, wherein
    the first spring and the second spring are respective helical compression springs,
    the first piston includes a first fitting portion to which an end of the first spring is fitted, and the first fitting portion regulates a movement range in a radial direction of the first spring,
    the second piston includes a second fitting portion to which the other end of the first spring is fitted, the second fitting portion regulating the movement range in the radial direction of the first spring, and
    the first spring is fitted to the first fitting portion by press fitting, and the first spring is fitted to the second fitting portion without execution of press fitting.

6. The stroke simulator according to claim 2, wherein
    the first spring and the second spring are respective helical compression springs,
    the first piston includes a first fitting portion to which an end of the first spring is fitted, and the first fitting portion regulates a movement range in a radial direction of the first spring,
    the second piston includes a second fitting portion to which the other end of the first spring is fitted, and the second fitting portion regulates the movement range in the radial direction of the first spring, and
    the first spring is fitted to the first fitting portion by press fitting, and the first spring is fitted to the second fitting portion without execution of press fitting.

7. The stroke simulator according to claim 3, wherein
    the first spring and the second spring are respective helical compression springs,
    the first piston includes a first fitting portion to which an end of the first spring is fitted, and the first fitting portion regulates a movement range in a radial direction of the first spring,
    the second piston includes a second fitting portion to which the other end of the first spring is fitted, and the second fitting portion regulates the movement range in the radial direction of the first spring, and
    the first spring is fitted to the first fitting portion by press fitting, and the first spring is fitted to the second fitting portion without execution of press fitting.

8. The stroke simulator according to claim 4, wherein
the first spring and the second spring are respective helical compression springs,
the first piston includes a first fitting portion to which an end of the first spring is fitted, and the first fitting portion regulates a movement range in a radial direction of the first spring,
the second piston includes a second fitting portion to which the other end of the first spring is fitted, and the second fitting portion regulates the movement range in the radial direction of the first spring, and
the first spring is fitted to the first fitting portion by press fitting, and the first spring is fitted to the second fitting portion without execution of press fitting.

9. The stroke simulator according to claim 1, wherein
when hydraulic pressure of the hydraulic pressure chamber is zero, a distance in a movement direction between the first piston and the second piston is taken to be a first stroke, a distance in the movement direction between the second piston and the stopper is taken to be a second stroke, and a sum of the first stroke and the second stroke is taken to be an overall stroke, and
the first stroke, the second stroke and the overall stroke can all be changed by adjusting a height of the first protruding portion and the second protruding portion of the second piston.

* * * * *